United States Patent
Sogo et al.

(10) Patent No.: US 9,318,769 B2
(45) Date of Patent: Apr. 19, 2016

(54) ELECTRODE ASSEMBLY AND ELECTRIC STORAGE DEVICE

(71) Applicant: GS Yuasa International Ltd., Kyoto-shi, Kyoto (JP)

(72) Inventors: Yasuhiro Sogo, Kyoto (JP); Kazuaki Matsuo, Kyoto (JP); Kazuhide Tozuka, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 280 days.

(21) Appl. No.: 13/938,827

(22) Filed: Jul. 10, 2013

(65) Prior Publication Data
US 2014/0017534 A1    Jan. 16, 2014

(30) Foreign Application Priority Data

Jul. 12, 2012  (JP) .................. 2012-156790

(51) Int. Cl.
| | |
|---|---|
| *H01M 10/04* | (2006.01) |
| *H01M 4/04* | (2006.01) |
| *H01M 4/139* | (2010.01) |
| *H01M 4/1391* | (2010.01) |
| *H01M 10/0525* | (2010.01) |
| *H01M 10/0587* | (2010.01) |
| *H01M 4/02* | (2006.01) |

(52) U.S. Cl.
CPC ........ *H01M 10/0431* (2013.01); *H01M 4/0404* (2013.01); *H01M 4/139* (2013.01); *H01M 4/1391* (2013.01); *H01M 10/0525* (2013.01); *H01M 10/0587* (2013.01); *H01M 2004/021* (2013.01); *H01M 2220/20* (2013.01); *Y02E 60/122* (2013.01); *Y02T 10/7011* (2013.01)

(58) Field of Classification Search
None
See application file for complete search history.

(56) References Cited

U.S. PATENT DOCUMENTS

| | | |
|---|---|---|
| 2005/0031950 A1 | 2/2005 | Maeda |
| 2007/0048615 A1 | 3/2007 | Nagayama et al. |
| 2007/0264577 A1 | 11/2007 | Katayama et al. |
| 2009/0067119 A1 | 3/2009 | Katayama et al. |
| 2009/0136844 A1 | 5/2009 | Watanabe et al. |
| 2011/0225808 A1 | 9/2011 | Shimizu |

FOREIGN PATENT DOCUMENTS

| | | |
|---|---|---|
| JP | 2003-208890 | 7/2003 |
| JP | 2006-012703 | 1/2006 |

(Continued)

OTHER PUBLICATIONS

Machine translation of JP 2008-243658, Oct. 2008.*

(Continued)

*Primary Examiner* — Jonathan Crepeau
(74) *Attorney, Agent, or Firm* — Rankin, Hill & Clark LLP

(57) ABSTRACT

Provided are an electrode assembly including a sheet-shaped current collector that has, on at least one face thereof, a mixture agent layer containing an active material and is spirally wound, in which the current collector has, in a portion on a side of at least one end of a winding axis, a non-mixture agent layer part having no mixture agent layer formed therein, and a mass per unit area of the mixture agent layer is larger in an edge portion on the side of the non-mixture agent layer part by 0.3% or more and 1.0% or less than in a portion other than the edge portion; and an electric storage device including the electrode assembly.

6 Claims, 1 Drawing Sheet

(56) References Cited

FOREIGN PATENT DOCUMENTS

| | | |
|---|---|---|
| JP | 2006-147349 | 6/2006 |
| JP | 2007-149400 | 6/2007 |
| JP | 2008173590 A2 | 7/2008 |
| JP | 2008-243658 | 10/2008 |
| JP | 2008-243825 | 10/2008 |
| JP | 2009-199962 | 9/2009 |
| JP | 2009211956 A2 | 9/2009 |
| JP | 2010020986 A2 | 1/2010 |
| JP | 2010212000 A2 | 9/2010 |

OTHER PUBLICATIONS

Extended European Search Report dated Nov. 21, 2013 filed in corresponding European application No. 13175902.9.

* cited by examiner

ELECTRODE ASSEMBLY AND ELECTRIC STORAGE DEVICE

CROSS-REFERENCE TO RELATED APPLICATIONS

This application claims the benefit of Japanese Patent Application No. 2012-156790, filed on Jul. 12, 2012, which is incorporated by reference.

FIELD

The present invention relates to an electrode assembly used in an electric storage device or the like, and an electric storage device including the electrode assembly.

BACKGROUND

In recent years, electric storage devices including cells such as a nonaqueous electrolyte cell and capacitors such as an electric double layer capacitor have been greatly put to a variety of uses. In particular, nonaqueous electrolyte cells typified by a lithium-ion battery cell have been frequently used for consumer appliances as, for example, power sources for electronic equipment such as a personal computer developed to be downsized and lightened and communication equipment including a cellular phone and the like, and as power sources or the like for vehicles including a hybrid electric vehicle (HEV), a plug-in hybrid electric vehicle (PHEV) and an electric vehicle (EV).

In such an electric storage device, an electrode assembly in which a positive electrode and a negative electrode stacked with a separator sandwiched therebetween are spirally wound is widely used. A positive electrode is formed as an electrode plate having a mixture agent layer formed on a current collector, which is fabricated, for example, by applying a mixture agent in the form of a paste containing a positive electrode active material, a binder and the like onto one face or both faces of a current collector, drying the applied mixture agent and pressing the resulting current collector. Furthermore, a negative electrode is similarly formed by using a negative electrode active material instead of the positive electrode active material.

A current collector is generally made of a rectangular metal foil or the like. In one side portion of the current collector, a non-mixture agent layer part having no mixture agent layer formed therein is provided. When the current collector is spirally wound for fabricating the electrode assembly, the non-mixture agent layer part is disposed on either side along an axial direction of the winding axis, so as to be connected to a lead line.

The mixture agent layer is formed by applying the mixture agent in the form of a paste. Therefore, the paste-form mixture agent sags and its thickness is reduced in an edge portion of the mixture agent layer on the side of the non-mixture agent layer part. If the mixture agent layer is wholly pressed while having such a smaller thickness portion, the density of the mixture agent layer becomes lower in the edge portion of the mixture agent layer on the side of the non-mixture agent layer part than in the other portion. Therefore, adhesiveness of the mixture agent layer becomes poor. If there is such a portion having poor adhesiveness in the edge portion of the mixture agent layer on the side of the non-mixture agent layer part, the mixture agent layer may be peeled off from the current collector during a step of preparing the electrode assembly or during an assembling step of incorporating the electrode assembly into an electric storage device. Thus, there is a problem in which the mixture agent layer is liable to come off from the current collector. In addition, if the mixture agent layer comes off from the current collector, it is apprehended that a part of the mixture agent layer may become a conductive foreign matter within the electric storage device and cause a short-circuit.

Attempts to prevent the mixture agent layer from coming off have been conventionally made. For example, Patent Literature 1 describes a method in which a mixture agent in the form of a paste is applied in a larger thickness in an edge portion for starting application than in the other applied portion in applying the mixture agent onto a current collector, and a resulting mixture agent layer is pressed as a whole after pressing and flattening the edge portion for starting the application. Patent Literature 1 describes that the density in the edge portion for starting the application of the mixture agent is higher than in the other applied portion, and hence the strength of the edge portion can be improved.

Patent Literature 2 describes that the thickness of an edge portion for starting application of a mixture agent in the form of a paste is adjusted to have a thickness ratio of 0.97 to 1.03 to the other applied portion, so that the edge portion for starting the application can be restrained from extremely rising, and hence, the mixture agent can be restrained from coming off at the edge portion.

However, in the method described in Patent Literature 1, the density of the mixture agent layer attained after pressing is set to a prescribed density by adjusting the thickness of the mixture agent layer obtained at the time of application. Therefore, it is necessary to adjust the application thickness of the mixture agent in consideration of thickness reduction caused through drying and pressing. Accordingly, it is difficult to accurately attain a desired density of the mixture agent layer by the method described in Patent Literature 1.

Furthermore, if there arises an excessively large difference in the density between the edge portion of the mixture agent layer and the portion other than the edge portion, a partial difference in hardness may be caused in the mixture agent layer. This may lead to a fear of rupture of the current collector from a portion having higher hardness in winding the current collector for fabricating the electrode assembly. Accordingly, it is necessary to accurately adjust the density difference in the edge portion of the mixture agent layer to an extent in which the adhesive strength of the mixture agent layer can be improved and the current collector is not ruptured. Particularly in an electrode assembly for high power used in a lithium-ion battery cell for an HEV or the like, the mixture agent layer is formed in a small thickness for obtaining high power. Therefore, it is difficult to accurately provide a slight density difference in such a thin mixture agent layer by the aforementioned method.

Also in the method described in Patent Literature 2, it is necessary to set the application thickness at the time of application on the assumption of a thickness attained after drying. Therefore, there arises a problem in which it is difficult to accurately attain a desired thickness of the mixture agent layer. Furthermore, there arises a problem in which it is difficult to provide a slight thickness difference between the edge portion of the mixture agent layer and the portion other than the edge portion.

CITATION LIST

Patent Literature

Patent Literature 1: Japanese Patent Application Laid-Open No. 2003-208890
Patent Literature 2: Japanese Patent Application Laid-Open No. 2008-243658

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention is to provide an electrode assembly in which the adhesiveness of a mixture agent layer onto a current collector can be accurately improved, and an electric storage device including the electrode assembly.

An electrode assembly according to the present invention includes a sheet-shaped current collector that has, on at least one face thereof, a mixture agent layer containing an active material and is spirally wound, the current collector has, in a portion on a side of at least one end of a winding axis, a non-mixture agent layer part having no mixture agent layer formed therein, and a mass per unit area of the mixture agent layer is larger in an edge portion on the side of the non-mixture agent layer part by 0.3% or more and 1.0% or less than in a portion other than the edge portion.

BRIEF DESCRIPTION OF DRAWINGS

The foregoing and other features of the present invention will become apparent from the following description and drawings of an illustrative embodiment of the invention in which.

DESCRIPTION OF EMBODIMENTS

Figure 1:
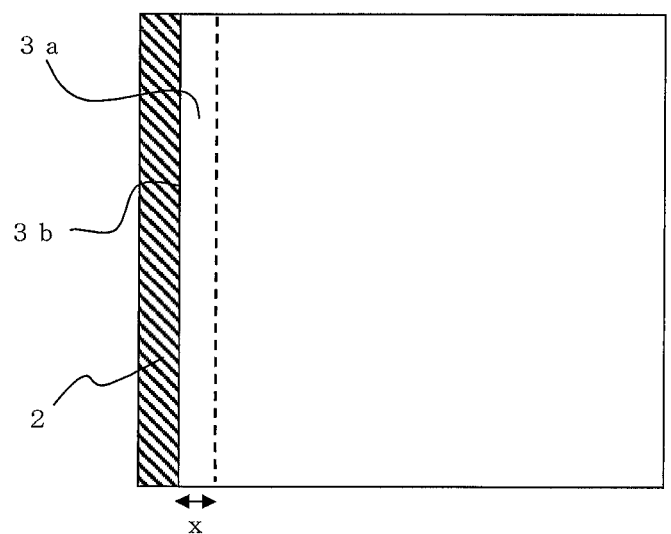
FIG. 1 is a schematic top view of a mixture agent layer obtained before winding to be used in an electrode assembly.

An electrode assembly according to the present embodiment is an electrode assembly including a sheet-shaped current collector that has, on at least one face thereof, a mixture agent layer containing an active material and is spirally wound, in which the current collector has, in a portion on a side of at least one end of a winding axis, a non-mixture agent layer part having no mixture agent layer formed therein, and a mass per unit area of the mixture agent layer is larger in an edge portion on the side of the non-mixture agent layer part by 0.3% or more and 1.0% or less than in a portion other than the edge portion.

In one aspect of the present embodiment, an edge portion 3a of a mixture agent layer 3 on the side of a non-mixture agent layer part 2 may be a part within 1 mm to 5 mm from an edge 3b of the mixture agent layer 3 on the side of the non-mixture agent layer part 2.

In another aspect of the present embodiment, a ratio of peel strength of the edge portion 3a of the mixture agent layer 3 on the side of the non-mixture agent layer part 2 to peel strength of the portion other than the edge portion 3a may be 104% or more.

According to the electrode assembly of the present embodiment, adhesiveness of the mixture agent layer onto the current collector can be accurately improved.

Now, preferred embodiments of the electrode assembly and the electric storage device of the present invention will be described with reference to the accompanying drawings.

The electrode assembly according to the present embodiment is an electrode assembly including a sheet-shaped current collector 1 that has, on at least one face thereof, a mixture agent layer 3 containing an active material and is spirally wound, in which the current collector 1 has, in a portion on a side of at least one end of a winding axis, a non-mixture agent layer part 2 having no mixture agent layer 3 formed therein, and a mass per unit area of the mixture agent layer 3 is larger in an edge portion on the side of the non-mixture agent layer part 2 by 0.3% or more and 1.0% or less than in a portion other than the edge portion.

Since the mass per unit area of the mixture agent layer 3 is larger in the edge portion 3a on the side of the non-mixture agent layer part 2 than in the portion other than the edge portion 3a by 0.3% or more and 1.0% or less, adhesive strength of the mixture agent layer 3 can be improved as well as rupture of the current collector 1 can be suppressed in fabrication of the electrode assembly. Furthermore, since the mass per unit area can be adjusted by adjusting the application amount of the mixture agent at the time of the application, even a slight mass per unit area can be accurately adjusted.

In the present invention, a mass per unit area refers to a mass (g) of the mixture agent layer 3 per unit area ($m^2$).

Specifically, the mass per unit area in the edge portion 3a of the mixture agent layer 3 on the side of the non-mixture agent layer part 2 refers to a mass (g) per unit area ($m^2$) of the mixture agent layer 3 present in a range within a prescribed width from an edge 3b thereof on the side of the non-mixture agent layer part 2. Also, the mass per unit area in the portion other than the edge portion 3a of the mixture agent layer 3 on the side of the non-mixture agent layer part 2 refers to a mass (g) per unit area ($m^2$) of the mixture agent layer 3 present in the portion other than the edge portion 3a on the side of the non-mixture agent layer part 2.

The electrode assembly of the present embodiment is used as an electrode assembly for an electric storage device such as a nonaqueous electrolyte secondary cell. The electrode assembly of the present embodiment is particularly suitable as an electrode assembly for a high power battery such as a lithium-ion battery cell for an HEV.

The current collector 1 is at least one of a positive electrode current collector and a negative electrode current collector. In the positive electrode current collector, for example, a rectangular metal foil such as an aluminum foil can be used. In the negative electrode current collector, for example, a rectangular metal foil such as a copper foil can be used.

The positive electrode current collector has a thickness of preferably approximately 5 to 30 μm. The negative electrode current collector has a thickness of preferably approximately 4 to 20 μm.

The face of the current collector 1 on which the mixture agent is to be applied may be subjected to a coupling treatment or another surface treatment for improving adhesiveness of the mixture agent layer 3. Alternatively, the face of the current collector 1 on which the mixture agent is to be applied may be provided with a layer for improving the adhesiveness of the mixture agent layer 3 (such as an undercoat layer).

The mixture agent layer 3 is formed by applying a mixture agent in the form of a paste containing an active material.

When the mixture agent is a positive electrode mixture agent for a positive electrode, the mixture agent is, for example, a paste-form mixture containing a positive electrode active material. When the mixture agent is a negative electrode mixture agent for a negative electrode, the mixture agent is, for example, a paste-form mixture containing a negative electrode active material.

When, for example, used in an electrode assembly for a lithium-ion battery cell, the positive electrode active material is not especially limited as long as it is a compound capable of occluding and releasing lithium.

The positive electrode active material for a lithium-ion battery cell can be selected, for example, from the group consisting of composite oxides represented by $Li_xMO_y$ (wherein M represents at least one transition metal) and polyanion compounds represented by $Li_wMe_x(XO_y)_z$ (wherein Me represents at least one transition metal, and X represents, for example, P, Si, B or V).

Examples of the composite oxides include $Li_xCoO_2$, $Li_xNiO_2$, $Li_xMn_2O_4$, $Li_xMnO_3$, $Li_xNi_yCo_{(1-y)}O_2$, $Li_xNi_yMn_zCo_{(1-y-z)}O_2$ and $Li_xNi_yMn_{(2-y)}O_4$.

Examples of the polyanion compounds include $LiFePO_4$, $LiMnPO_4$, $LiNiPO_4$, $LiCoPO_4$, $Li_3V_2(PO_4)_3$, $Li_2MnSiO_4$ and $Li_2CoPO_4F$.

In the positive electrode active material, an element of such a compound or a part of the polyanion may be replaced by another element or anionic species respectively.

Other examples of the positive electrode active material include conductive polymeric compounds, such as disulfide, polypyrrole, polyaniline, polyparastyrene, polyacetylene and polyacene materials, and pseudo-graphite structure carbonaceous materials.

As the positive electrode active material, one of these compounds may be singly used, or a mixture of two or more of these may be used.

When used, for example, in an electrode assembly for a lithium-ion battery cell, examples of the negative electrode active material include a lithium metal and a lithium alloy (a lithium metal-containing alloy such as lithium-aluminum, lithium-lead, lithium-tin, lithium-aluminum-tin, lithium-gallium or wood's alloy). Other examples of the negative electrode active material include an alloy capable of occluding and releasing lithium, a carbon material (such as graphite, hard carbon, low temperature fired carbon or amorphous carbon), a metal oxide, a lithium metal oxide (such as $Li_4Ti_5O_{12}$) and a polyphosphoric acid compound.

As the negative electrode active material, a carbon material such as graphite, hard carbon, low temperature fired carbon or amorphous carbon, a metal oxide, a lithium metal oxide (such as $Li_4Ti_5O_{12}$), a polyphosphoric acid compound or the like is preferably used because a mixture agent including such a material can be easily applied.

The positive electrode active material and the negative electrode active material are powders. The powder preferably has an average particle size d50 of approximately 1 to 20 μm. The powder of each active material is formed into desired size and shape by using a granulator or a classifier.

The mixture agent is preferably a mixture agent in the form of a paste in which the positive or negative electrode active material and an arbitrary component, if necessary, such as a binder, a conducting agent, a thickening agent or a filler, are mixed.

Figure 2:
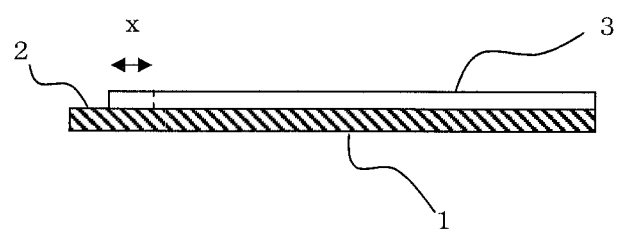
FIG. 2 is a schematic side view of the mixture agent layer obtained before winding to be used in an electrode assembly.

The mixture agent layer 3 is formed by applying a mixture agent for a positive electrode onto a positive electrode current collector or applying a mixture agent for a negative electrode onto a negative electrode current collector. At the time of the application, the mixture agent is applied, as illustrated in FIGS. 1 and 2, so as to provide the non-mixture agent layer part 2 having no mixture agent layer 3 formed therein extending along an edge on one side of the current collector 1 that has a rectangular shape in a top view. Specifically, the one side of the current collector 1 corresponds to a side of one end along the axial direction of a winding axis in spirally winding the current collector.

The mixture agent layer 3 is formed to be different in the mass per unit area between the edge portion 3a on the side of the non-mixture agent layer part 2 (the mixture agent layer edge portion) and the portion other than the edge portion.

The mixture agent layer edge portion 3a refers to a part of the mixture agent layer 3 within a prescribed width x from the edge 3b of the mixture agent layer 3 on the side of the non-mixture agent layer part 2 as illustrated in FIGS. 1 and 2. This mixture agent layer edge portion 3a is formed to have a mass per unit area larger by 0.3% to 1.0% than that of the portion other than the mixture agent layer edge portion 3a.

The mass per unit area of the mixture agent layer 3 is preferably 40 g/m² to 300 g/m², and more preferably approximately 60 g/m² to 160 g/m² in the portion other than the mixture agent layer edge portion 3a.

When the mass per unit area falls in this range, a sufficient amount of active material can be secured in the mixture agent layer 3.

On the other hand, in the mixture agent layer edge portion 3a, the mass per unit area is preferably 40.12 g/m² to 303.00 g/m², and more preferably approximately 60.18 g/m² to 161.60 g/m².

When the mass per unit area of the mixture agent in the mixture agent layer edge portion 3a falls in this range, the adhesiveness of the mixture agent layer edge portion 3a can be well kept even after drying and pressing the mixture agent so as to restrain the mixture agent layer 3 from coming off at the edge portion. In addition, the mixture agent layer 3 can be restrained from becoming partially so hard that the current collector 1 may be ruptured during the fabrication procedure.

The width x of the mixture agent layer edge portion 3a is preferably approximately 1 mm to 5 mm. When the width x of the mixture agent layer edge portion 3a falls in this range, the adhesiveness of the mixture agent layer edge portion 3a can be more improved and the rupture of the current collector 1 can be more suppressed during the fabrication procedure. Furthermore, the adhesiveness of the mixture agent layer edge portion 3a can be well kept even after drying and pressing the mixture agent so as to restrain the mixture agent layer 3 from coming off at the edge portion. In addition, the current collector 1 can be restrained from rupturing in pressing or winding.

The method for applying the mixture agent is not especially limited, and for example, roller coating with a die head coater, a comma roll, a gravure coater or an applicator roll, spray coating, screen coating, a doctor blade method, spin coating or a bar coater method can be employed. A die head coater is particularly preferably used.

When a die head coater is used for applying the mixture agent, the amount of the mixture agent to be discharged can be accurately controlled with ease owing to the shape of a shim provided at an end of a paste discharge part. Besides, even a small discharge amount can be accurately controlled. Therefore, the aforementioned adjustment for the mass per unit area can be easily performed.

In applying the mixture agent by using a die head coater, the amount of the mixture agent to be discharged can be adjusted while changing a position for the application. Alternatively, the mass per unit area may be adjusted by uniformly applying the mixture agent onto the face of the current collector 1 on which the mixture agent layer 3 is to be formed and then applying the mixture agent again in the mixture agent layer edge portion 3a alone.

The mixture agent layer 3 having the aforementioned mass per unit area may be formed on both the positive electrode current collector and the negative electrode current collector, or may be formed on merely one of the positive electrode current collector and the negative electrode current collector.

For forming the mixture agent layer 3 of the electrode assembly of the present embodiment, a pressing step is performed after the application step of applying the mixture agent. In the pressing step, the applied mixture agent is first dried before pressing. The pressing can be performed by any known method under any known condition. In the pressing step, the mixture agent layer 3 is preferably pressed by using, for example, a roll press.

The current collector 1 may be prepared by performing a winding-up step for once winding up the current collector 1 with the mixture agent applied thereon by a winder before the pressing step.

When such a winding-up step is performed, even when a speed of feeding the current collector 1 is different between the application step and the pressing step, the difference in the speed may be adjusted, and hence, producibility of the electrode assembly can be improved.

In the winding-up step, the rupture of the current collector 1 caused in the winding-up step may be more suppressed because the mixture agent layer 3 has been formed to have the aforementioned mass per unit area.

The mixture agent layer 3 formed by the method described so far is preferably formed to have substantially the same average thickness in the edge portion thereof on the side of the non-mixture agent layer part 2 and in the portion thereof other than the edge portion.

When the mixture agent layer 3 is formed to have substantially the same thickness in the respective portions as described above, the mixture agent layer 3 has a flat surface as a whole. Therefore, when the current collector 1 having the mixture agent layer 3 is used for fabricating an electrode assembly, a distance between the positive electrode and the negative electrode is constant, so as to suppress deviation otherwise occurring in a charge-discharge reaction.

The electrode assembly of the present embodiment is fabricated by stacking the negative electrode current collector and the positive electrode current collector respectively having the mixture agent layers 3 with the separator sandwiched therebetween and spirally winding the stacked current collectors so as to have the one sides of the current collectors 1 (namely, the one sides of the current collectors having the non-mixture agent layer parts 2) disposed at one end along the axial direction of the winding axis. Furthermore, in the electrode assembly of the present embodiment, the negative electrode current collector and the positive electrode current collector are stacked to have their mixture agent layers opposing each other with the separator sandwiched therebetween. Besides, in the electrode assembly of the present embodiment, the current collectors are spirally wound so as to have the non-mixture agent layer parts 2 of the respective current collectors 1 serving as an end to which a lead line is to be connected.

The separator can be appropriately selected from known separators. Examples include separators of a woven fabric, a non-woven fabric and a synthetic resin microporous film.

When the electrode assembly of the present embodiment is an electrode assembly for a nonaqueous electrolyte cell, examples of the material for the separator include polyolefin resins typified by polyethylene and polypropylene; polyester resins typified by polyethylene terephthalate and polybutylene terephthalate; polyvinylidene fluoride, a vinylidene fluoride-hexafluoropropylene copolymer, a vinylidene fluoride-perfluorovinyl ether copolymer, a vinylidene fluoride-tetrafluoroethylene copolymer, a vinylidene fluoride-trifluoroethylene copolymer, a vinylidene fluoride-fluoroethylene copolymer, a vinylidene fluoride-hexafluoroacetone copolymer, a vinylidene fluoride-ethylene copolymer, a vinylidene fluoride-propylene copolymer, a vinylidene fluoride-trifluoropropylene copolymer, a vinylidene fluoride-tetrafluoroethylene-hexafluoropropylene copolymer and a vinylidene fluoride-ethylene-tetrafluoroethylene copolymer.

When the electrode assembly of the present embodiment is put in a cell case together with, for example, a nonaqueous electrolyte, a nonaqueous electrolyte cell (such as a lithium-ion battery cell) working as an electric storage device can be obtained.

In the electrode assembly of the present embodiment, the mixture agent layer 3 is restrained from peeling and coming off from the current collector 1 during the fabrication procedure for the electrode assembly, such as the winding-up step, the pressing step and the winding step. Therefore, when the electrode assembly of the present embodiment is used as an electrode assembly for an electric storage device, a short-circuit in the electric storage device otherwise caused by a part of the mixture agent layer 3 having come off as a conductive foreign matter can be suppressed. Furthermore, in the respective steps of the fabrication, the current collector 1 can be restrained from rupturing, and hence, the defect rate can be suppressed in the fabrication procedure.

In the electrode assembly of the present embodiment, a ratio of peel strength of the edge portion 3a of the mixture agent layer 3 on the side of the non-mixture agent layer part 2 to that of the portion other than the edge portion 3a is preferably 104% or more.

When the ratio is 104% or more, the occurrence of a short-circuit and the occurrence of defects in the fabrication procedure can be further suppressed.

The ratio of the peel strength of the edge portion 3a of the mixture agent layer 3 on the side of the non-mixture agent layer part 2 to the peel strength of the portion other than the edge portion 3a refers to a value, which is calculated in accordance with the following expression by using the peel strengths respectively measured, in accordance with JIS K 6854-2, in the edge portion 3a of the mixture agent layer 3 on the side of the non-mixture agent layer part 2 and in the portion other than the edge portion 3a:

Peel strength of edge portion on the side of non-mixture agent layer part÷peel strength of portion other than edge portion×100(%)

The peel strength is measured by a method described in an example below.

The electrode assembly and the electric storage device of the present embodiment have been described so far. It is noted that the embodiments described herein are not restrictive but merely illustrative in all aspects. The scope of the invention is defined by the appended claims rather than by the description preceding them, and all changes that fall within meets and bounds of the claims, or equivalence of such meets and bounds are therefore intended to be embraced by the claims.

EXAMPLES

Now, the present invention will be described more specifically with reference to examples and comparative examples. It is noted that the present invention is not limited to the following examples.

Example 1

Electrode plates (a positive electrode and a negative electrode) were prepared as follows:
Materials:
Material for Current Collector:
Positive electrode current collector: made of aluminum with a thickness of 20 μm
Negative electrode current collector: made of copper with a thickness of 10 μm
Mixture Agent:
Mixture Agent for Positive Electrode:

| | |
|---|---|
| $LiMn_{1/3}Ni_{1/3}Co_{1/3}O_2$ | 90% by mass |
| Acetylene black | 4% by mass |
| PVDF | 6% by mass |

Solvent: N-methyl pyrrolidone (NMP)
Mixture Agent for Negative Electrode:

| | |
|---|---|
| Hard carbon | 90% by mass |
| PVDF | 10% by mass |

Solvent: N-methyl pyrrolidone
Separator: Made of Polyolefin Microporous Film
Fabrication Method:

The mixture agent for a positive electrode was applied on one face of the positive electrode current collector for forming a mixture agent layer thereon.

A die head coater was used as coating equipment.

The mixture agent layer was formed so as to provide a non-mixture agent layer part having no mixture agent applied therein in an edge portion along one side of the current collector.

At this point, the mixture agent was applied, so that the mass per unit area was larger by 0.3% in a portion away from an edge of the mixture agent layer on the side of the non-mixture agent layer part by 1 mm to 3 mm (that is, a portion having a width of 2 mm) than in the other portion.

Subsequently, the mixture agent was dried, then the resultant was pressed by a roll press and dried, so as to prepare a positive electrode. The pressing pressure was adjusted so as to attain a uniform thickness in the mixture agent layer edge portion and the other portion.

An increment ratio ($(a-b)/b\times100$) of the mass per unit area (a) in the mixture agent layer edge portion to the mass per unit area (b) in the other portion of the mixture agent layer was 0.3%.

On the other hand, a negative electrode was prepared by applying the mixture agent for the negative electrode into a uniform thickness wholly over one face of the negative electrode current collector, and pressing the resultant by a roll press and drying the resultant in the same manner as the positive electrode.

The positive electrode and the negative electrode thus prepared were stacked with their mixture agent layers opposing each other with the separator sandwiched therebetween, and the stacked electrodes were spirally wound, and thus, an electrode assembly was prepared. The electrode assembly was enclosed in an aluminum case together with an electrolyte and subjected to an aging treatment, and thus, a cell was fabricated.

Peel Strength Test:

For a peel strength test, a positive electrode current collector having a mixture agent layer on one face thereof was prepared as a sample.

Specifically, the sample was prepared in the same manner as described above except that the mixture agent was applied over the whole one face of the current collector to have the same mass per unit area as that in the portion having a width of 1 mm to 3 mm from the edge of the mixture agent layer on the side of the non-mixture agent layer part.

The peel strength was measured in accordance with a method defined in JIS K 6854-2.

The sample was vacuum dried at 150° C. for 12 hours, and then cut into a size of 35×60 mm to be fixed on a jig. Instead of an adherend and a flexible adherend, a mending tape (tradename: MP-18, manufactured by Sumitomo 3M Ltd.) with a length of 50 mm was used in the peel strength test.

Short-Circuit Test:

A cell having been subjected to the aging treatment was charged at a constant voltage of 3.0 V and measured for an open circuit voltage. The cell was allowed to stand in this state for 1 week, and the open circuit voltage was measured again thereafter. When the open circuit voltage was lower by 10 mV or more than that obtained after the aging treatment, it was determined that there was a micro short-circuit.

Appearance Test:

A negative electrode prepared as described above was wound up around a coil. The appearance of the negative electrode was observed for examining whether or not the wound-up negative electrode was ruptured.

Examples 2 to 6 and Comparative Examples 1 to 8

Electrode plates of Examples 2 to 6 and Comparative Examples 1 to 8 were fabricated in the same manner as that of Example 1 except that the mass per unit area of the mixture agent layer of each positive electrode was adjusted to satisfy a relationship listed in Table 1. The electrode plates were subjected to the peel strength test, the short-circuit test and the appearance test in the same manner as in Example 1. Incidentally, in Examples 1 to 6 and Comparative Examples 2 to 8, the mass per unit area of the positive electrode mixture agent layer in the portion other than the portion having a width of 1 mm to 3 mm from the edge thereof on the side of the non-mixture agent layer part was adjusted to be the same as that of Comparative Example 1.

A peel strength ratio was obtained by calculating a ratio (%) on the basis of the peel strength (gf) of each of Examples 1 to 6 and Comparative Examples 2 to 8 by assuming that the peel strength (gf) of Comparative Example 1 was 100%.

The results are shown in Table 1.

TABLE 1

| | Increment ratio of mass per unit area (%) a − b/b × 100 | Peel strength ratio (%) | Short-circuit | Appearance defect |
|---|---|---|---|---|
| Comparative Example 1 | 0.0 | 100 | micro short-circuit caused | none |
| Comparative Example 2 | 0.2 | 102 | micro short-circuit caused | none |

TABLE 1-continued

|  | Increment ratio of mass per unit area (%) a − b/b × 100 | Peel strength ratio (%) | Short-circuit | Appearance defect |
|---|---|---|---|---|
| Comparative Example 3 | 1.6 | 124 | none | ruptured |
| Comparative Example 4 | 2.2 | 126 | none | ruptured |
| Comparative Example 5 | 2.6 | 129 | none | ruptured |
| Comparative Example 6 | 3.0 | 126 | none | ruptured |
| Comparative Example 7 | 3.0 | 128 | none | ruptured |
| Comparative Example 8 | 4.5 | 124 | none | ruptured |
| Example 1 | 0.3 | 104 | none | none |
| Example 2 | 0.5 | 115 | none | none |
| Example 3 | 0.7 | 121 | none | none |
| Example 4 | 0.9 | 127 | none | none |
| Example 5 | 1.0 | 119 | none | none |
| Example 6 | 1.0 | 123 | none | none |

It is obvious from the results shown in Table 1 that the cells of the examples have higher peel strength than the cells of the comparative examples. Furthermore, in Comparative Examples 1 and 2 in which the increment ratio of the mass per unit area in the edge portion was low, a micro short-circuit was caused. Besides, in Comparative Examples 3 to 8 in which the increment ratio of the mass per unit area was high, the current collectors were ruptured.

What is claimed is:

1. An electrode assembly comprising a sheet-shaped current collector that has, on at least one face thereof, a mixture agent layer containing an active material and is spirally wound,
   wherein the current collector has, in a portion on a side of at least one end of a winding axis, a non-mixture agent layer part having no mixture agent layer formed therein, and
   a mass per unit area of the mixture agent layer is larger in an edge portion on the side of the non-mixture agent layer part by 0.3% or more and 1.0% or less than in a portion other than the edge portion.

2. The electrode assembly according to claim 1, wherein the edge portion of the mixture agent layer on the side of the non-mixture agent layer part corresponds to a part within 1 mm to 5 mm from an edge of the mixture agent layer on the side of the non-mixture agent layer part.

3. The electrode assembly according to claim 1, wherein a ratio of peel strength of the edge portion of the mixture agent layer on the side of the non-mixture agent layer part to peel strength of the portion other than the edge portion is 104% or more.

4. An electric storage device comprising an electrode assembly and a case for housing the electrode assembly,
   the electrode assembly including a sheet-shaped current collector that has, on at least one face thereof, a mixture agent layer containing an active material and is spirally wound,
   wherein the current collector has, in a portion on a side of at least one end of a winding axis, a non-mixture agent layer part having no mixture agent layer formed therein, and
   a mass per unit area of the mixture agent layer is larger in an edge portion on the side of the non-mixture agent layer part by 0.3% or more and 1.0% or less than in a portion other than the edge portion.

5. The electric storage device according to claim 4, wherein the edge portion of the mixture agent layer on the side of the non-mixture agent layer part corresponds to a part within 1 mm to 5 mm from an edge of the mixture agent layer on the side of the non-mixture agent layer part.

6. The electric storage device according to claim 4, wherein a ratio of peel strength of the edge portion of the mixture agent layer on the side of the non-mixture agent layer part to peel strength of the portion other than the edge portion is 104% or more.

* * * * *